United States Patent (10) Patent No.: US 10,446,869 B2
Eom et al. (45) Date of Patent: Oct. 15, 2019

(54) BATTERY MODULE, BATTERY PACK INCLUDING SAME, AND METHOD FOR MANUFACTURING CASING FOR BATTERY MODULE

(71) Applicant: LG CHEM, LTD., Seoul (KR)

(72) Inventors: Young-Sop Eom, Daejeon (KR); Nam-In Kim, Daejeon (KR); Jae-Hyun Seo, Daejeon (KR); Bo-Hyon Kim, Daejeon (KR); Hyun-Young Cho, Daejeon (KR)

(73) Assignee: LG CHEM, LTD., Seoul (KR)

(*) Notice: Subject to any disclaimer, the term of this patent is extended or adjusted under 35 U.S.C. 154(b) by 138 days.

(21) Appl. No.: 15/554,494

(22) PCT Filed: Sep. 2, 2016

(86) PCT No.: PCT/KR2016/009870
§ 371 (c)(1),
(2) Date: Aug. 30, 2017

(87) PCT Pub. No.: WO2017/052104
PCT Pub. Date: Mar. 30, 2017

(65) Prior Publication Data
US 2018/0062196 A1    Mar. 1, 2018

(30) Foreign Application Priority Data

Sep. 23, 2015 (KR) .................. 10-2015-0134847

(51) Int. Cl.
*H01M 10/04* (2006.01)
*H01M 2/10* (2006.01)
*H01M 2/20* (2006.01)

(52) U.S. Cl.
CPC ......... *H01M 10/04* (2013.01); *H01M 2/1077* (2013.01); *H01M 2/202* (2013.01); *H01M 2220/20* (2013.01)

(58) Field of Classification Search
CPC ............... H01M 10/04; H01M 2/1077; H01M 2220/20; H01M 2/202
See application file for complete search history.

(56) References Cited

U.S. PATENT DOCUMENTS 9,620,826 B2    4/2017  Yang et al.
9,793,520 B2   10/2017  Knapp et al.
(Continued)

FOREIGN PATENT DOCUMENTS

CN         101395737 A      3/2009
DE   10 2007 041 700 A1   7/2009
(Continued)

OTHER PUBLICATIONS

International Search Report, issued in PCT/KR2016/009870 (PCT/ISA/210), dated Dec. 27, 2016.

*Primary Examiner* — Lisa S Park
(74) *Attorney, Agent, or Firm* — Birch, Stewart, Kolasch & Birch, LLP

(57) ABSTRACT

A battery module is provided. A battery module according to an embodiment of the present disclosure includes a cartridge assembly including a plurality of cartridges, each cartridge accommodating a battery cell, a casing including an opening formed therein and accommodating the cartridge assembly through the opening and surrounding the cartridge assembly, and a cover coupled to the opening of the casing.

8 Claims, 10 Drawing Sheets

(56) References Cited

U.S. PATENT DOCUMENTS

| | | | |
|---|---|---|---|
| 2007/0072066 A1 | 3/2007 | Yoon et al. | |
| 2011/0135994 A1* | 6/2011 | Yang | H01M 2/0212 429/159 |
| 2012/0080941 A1 | 4/2012 | Scheucher | |
| 2012/0114999 A1 | 5/2012 | Park et al. | |
| 2015/0072178 A1 | 3/2015 | Gu | |
| 2015/0228942 A1 | 8/2015 | Shimoda et al. | |

FOREIGN PATENT DOCUMENTS

| | | |
|---|---|---|
| DE | 20 2014 100 783 U1 | 6/2015 |
| JP | S51-41663 U | 3/1976 |
| JP | S57-197677 U | 12/1982 |
| JP | H1-133787 U | 9/1989 |
| JP | 2003-197168 A | 7/2003 |
| JP | 2013-125737 A | 6/2013 |
| JP | 2014-78366 A | 5/2014 |
| KR | 10-2012-0048261 A | 5/2012 |
| KR | 10-2015-0029371 A | 3/2015 |
| KR | 10-2015-0070724 A | 6/2015 |

\* cited by examiner

BATTERY MODULE, BATTERY PACK INCLUDING SAME, AND METHOD FOR MANUFACTURING CASING FOR BATTERY MODULE

TECHNICAL FIELD

The present disclosure relates to a battery module, a battery pack including the battery module, and a method of manufacturing a casing for the battery module, and more particularly, to a battery module including a casing that surrounds a cartridge assembly to protect the cartridge assembly, a battery pack including the battery module, and a method of manufacturing the casing for the battery module.

The present application claims priority to Korean Patent Application No. 10-2015-0134847 filed on Sep. 23, 2015 in the Republic of Korea, the disclosure of which is incorporated herein by reference.

BACKGROUND ART

Technological development and increasing demand for mobile devices have led to a rapid increase in the demand for secondary batteries as an energy source, and nickel-cadmium batteries or hydrogen-ion batteries have been used as conventional secondary batteries, but recently, lithium secondary batteries have been widely used due to their very low self-discharge rate, high energy density, and free charging/discharging since a memory effect does not substantially occur in comparison to nickel-based secondary batteries.

Such a lithium secondary battery mainly uses lithium-based oxide and a carbon material as a cathode active material and an anode active material, respectively. The lithium secondary battery includes an electrode assembly, which includes a cathode plate coated with the cathode active material, an anode plate coated with the anode active material, and a separator interposed therebetween, and an outer casing, i.e., a battery case, to accommodate with a hermetic seal the electrode assembly therein along with an electrolyte solution.

A lithium secondary battery includes a cathode, an anode, and a separator and an electrolyte that are interposed therebetween, and is classified into a lithium-ion battery (LIB) and a polymer lithium-ion battery (PLIB) depending on materials used for a cathode active material and an anode active material. Typically, an electrode of a lithium secondary battery is formed by applying a cathode active material or an anode active material to a current collector such as an aluminum or copper sheet, a mesh, a film, foil, etc.

Generally, a plate is coupled to a battery module of a secondary battery to protect internal parts of the battery module from vibration, a shock, etc. However, in a conventional battery module, separate plates are coupled to a battery cell, thus being inadequate for overall protection of the battery cell, and the number of parts increases due to the separate plates and a coupling process is complicated due to coupling of the separate plates.

DISCLOSURE

Technical Problem

The present disclosure is designed to solve the problems of the related art, and therefore the present disclosure is directed to providing a battery module including a casing that surrounds a cartridge assembly to protect the cartridge assembly, thereby reducing the number of parts and simplifying a coupling process, a battery pack including the battery module, and a method of manufacturing the casing for the battery module.

The present disclosure is also directed to providing a battery module in which a casing and a cover are easily coupled or decoupled to or from each other by a hook member, a battery pack including the battery module, and a method of manufacturing the casing for the battery module.

Technical Solution

In one aspect of the present disclosure, there is provided a battery module that includes a cartridge assembly including a plurality of cartridges, each cartridge accommodating a battery cell, a casing including an opening formed therein and accommodating the cartridge assembly through the opening and surrounding the cartridge assembly, and a cover coupled to the opening of the casing.

At least any one surface of the casing may include cut bonding parts to be bonded to each other for ease of processing.

The casing may further include a through part formed to expose at least one of a connector element and a terminal element of the cartridge assembly to the outside.

The through part may be formed in a region adjacent to the bonding part on a surface of the casing.

The battery module may further include a hook member selectively coupling and decoupling the casing and the cover with or from each other.

The hook member may include at least one hook protrusion provided on the casing, and at least one coupling hole provided in the cover to allow the hook protrusion to be coupled thereto.

The hook member may include at least one hook protrusion provided on the cover and at least one coupling hole provided in the casing to allow the hook protrusion to be coupled thereto.

In another aspect of the present disclosure, there are provided a battery pack including the above-described battery module and a vehicle including the battery module.

In another aspect of the present disclosure, there is provided a method of manufacturing a casing for a battery module, the method including (a) preparing a plate for manufacturing the casing, and punching the plate, (b) bending the plate into a shape corresponding to a shape of a cartridge assembly such that the casing surrounds the cartridge assembly, and (c) bonding cut bonding parts formed in the plate to each other.

The bonding parts may be bonded by welding, a rivet, a bolt, a pin, a bracket, or a moment connection.

The operation step (a) may include punching the plate to form a through part formed to expose at least one of a connector element and a terminal element of the cartridge assembly to an outside.

The operation step (c) may include overlappingly bending the cut bonding parts of the plate and bonding the bonding parts to each other.

In another aspect of the present disclosure, there is provided a battery module including a casing manufactured by the method of manufacturing a casing for a battery module.

Advantageous Effects

Embodiments of the present disclosure include a casing that surrounds a cartridge assembly to protect the cartridge assembly, such that the number of parts is reduced when compared to a related art including separate plates.

Moreover, an integrated casing is provided to accommodate the cartridge assembly, thereby facilitating and simplifying a coupling process when compared to the related art in which the separate plates are coupled by welding, etc.

Furthermore, a casing and a cover are coupled using a hook member, facilitating coupling and decoupling therebetween in comparison to the related art.

BEST MODE

Figure 1:
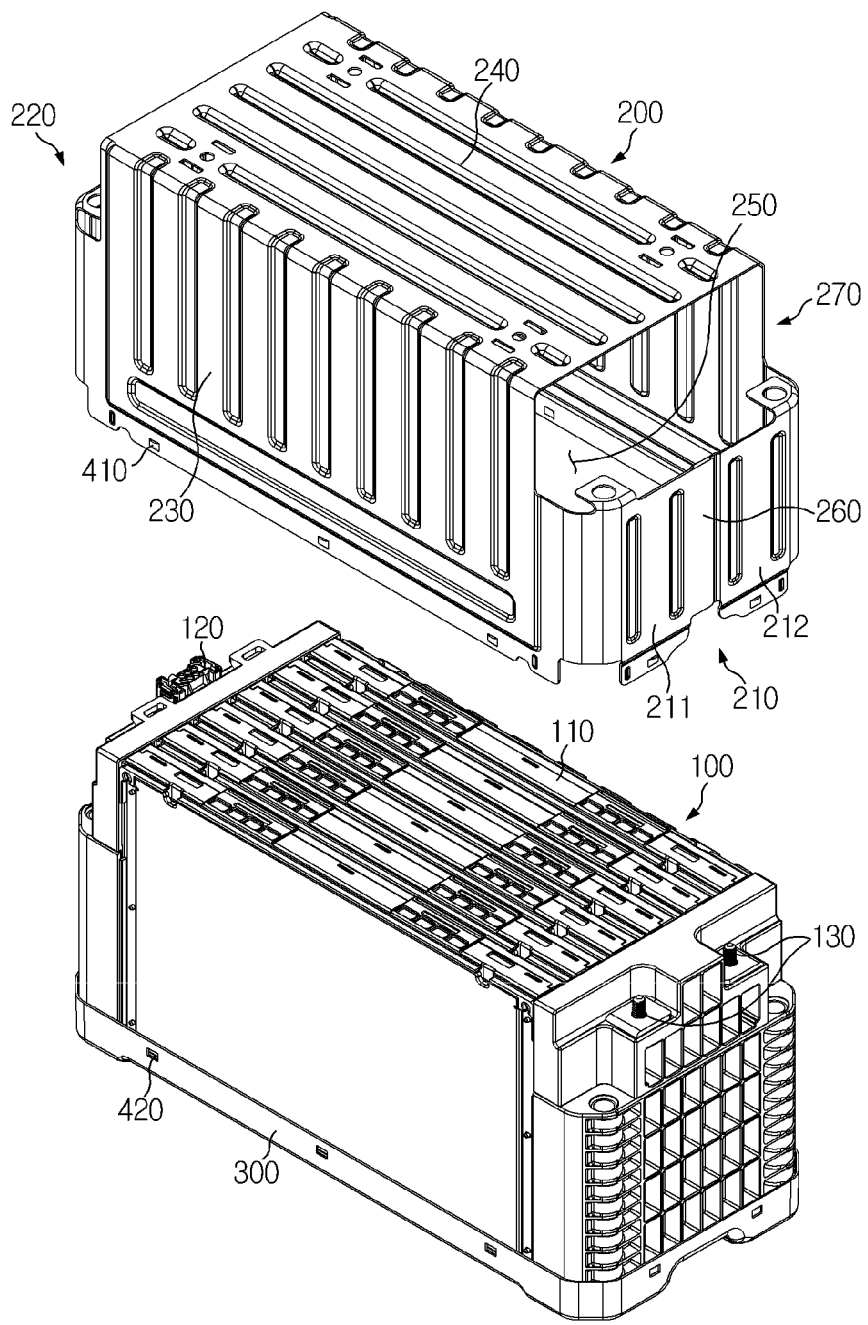
FIG. 1 is an exploded perspective view of a battery module according to an embodiment of the present disclosure.

Hereinafter, a battery module, a battery pack including the same, and a method of manufacturing a casing for the battery module according to embodiments of the present disclosure will be described in detail with reference to the accompanying drawings.

The terms or words used in the description and claims below should not be interpreted as only general or dictionary meanings, but interpreted as meanings and concepts satisfying the technical spirit of the present disclosure based on a principle in that the inventor can appropriately define his/her disclosure with a concept of the terms in order to describe the disclosure in the best method. Therefore, since embodiments described in the present specification and configurations shown in the drawings are merely exemplary embodiments of the present disclosure and do not represent all of the technical spirit of the present disclosure, it should be understood that there may be various equivalents and modified examples that can replace the embodiments described in the present specification and the configurations shown in the drawings at the time of filing the present application.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

As used herein, the term 'couple' or 'connect' includes not only direct coupling or connection between a member and another member, but also indirect coupling or connection of a member with another member using a coupling or connecting member.

Figure 2:
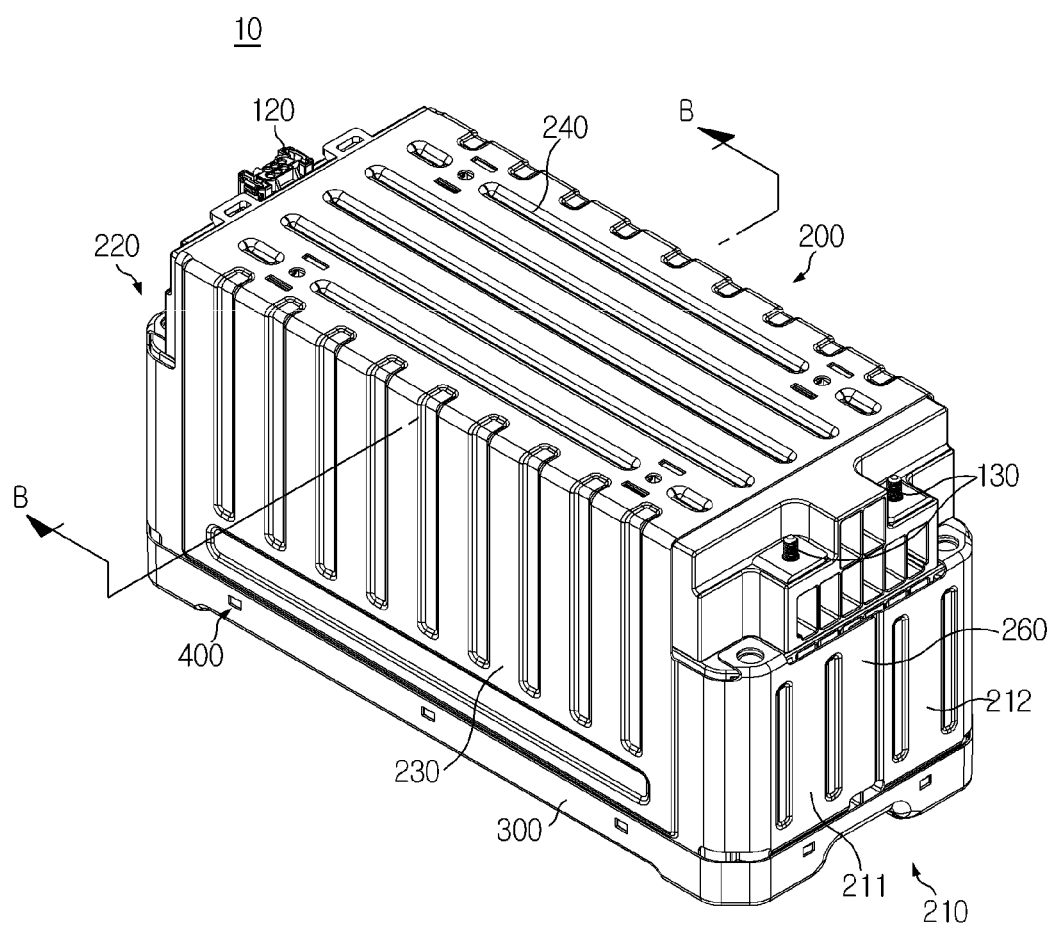
FIG. 2 is a coupled perspective view of FIG. 1.
Figure 3:
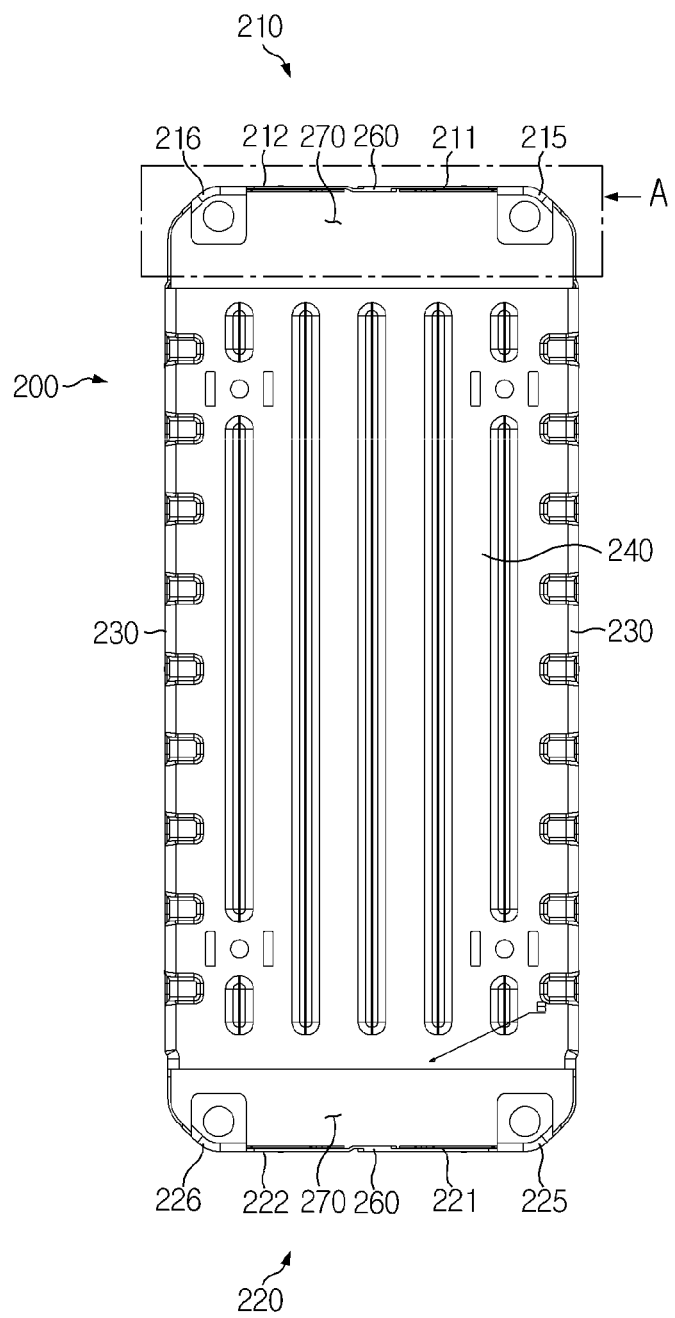
FIG. 3 is a top plan view of a casing in a battery module according to an embodiment of the present disclosure.
Figure 4:
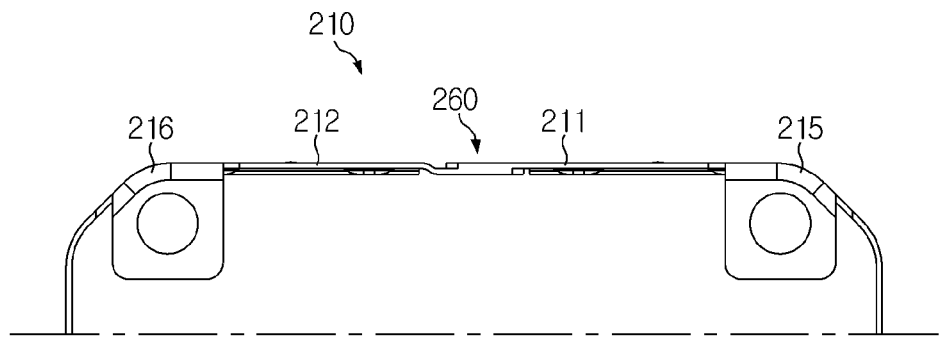
FIG. 4 is an enlarged view of a part A of FIG. 3.

FIG. 1 is an exploded perspective view of a battery module according to an embodiment of the present disclosure, FIG. 2 is a coupled perspective view of FIG. 1, FIG. 3 is a top plan view of a casing in a battery module according to an embodiment of the present disclosure, and FIG. 4 is an enlarged view of a part A of FIG. 3.

Referring to FIGS. 1 through 4, a battery module 10 according to an embodiment of the present disclosure may include a cartridge assembly 100, a casing 200, and a cover 300.

Referring to FIG. 1, the cartridge assembly 100 may include a plurality of cartridges that accommodate a battery cell 110. The cartridge assembly 100 may be manufactured by injection molding of plastic, and the cartridges having an accommodating part capable of accommodating the battery cell 110 formed therein may be stacked in the cartridge assembly 100. The cartridge assembly 100 is accommodated in a space formed by coupling between the casing 200 and the cover 300, and the battery cell 100 accommodated in a cartridge may be accommodated in the space and protected. The cartridge assembly 100 may include a connector element 120 or a terminal element 130. The connector element 120 may include various forms of an electric connection part or connection member for connection to, for example, a battery management system (BMS, not shown) capable of providing data of a voltage or a temperature of the battery cell 110. The terminal element 130 is a main terminal connected to the battery cell 110 and may include a cathode terminal and an anode terminal, and may also include a terminal bolt for electric connection with an external device.

Referring to FIGS. 1 through 4, the casing 200 surrounds the entire cartridge assembly 100 to protect the cartridge assembly 100 from external vibration or shock. The casing 200 may be formed to have a shape corresponding to a shape of the cartridge assembly 100. For example, if the cartridge assembly 100 has a hexahedral shape, the casing 200 may also have a hexahedral shape to correspond to the shape of the cartridge assembly 100. The casing 200 may be manufactured by bending a plate of, for example, a metal material, and thus the casing 200 may be integrally manufactured as one piece. When the casing 200 is manufactured to include the plate of the metal material, the casing 200 may include a front plate 210, a back plate 220, a side plate 230, and a top plate 240. When the casing 200 is integrally manufactured as one piece, i.e., when the front plate 210, the back plate 220, the side plate 230, and the top plate 240 are integrally manufactured as one piece, a coupling process may be facilitated and simplified. That is, in a conventional case, for the battery cell 110, a plurality of protection plates that are separated are coupled to one another, and when the plurality of plates are coupled by, for example, welding, each of the plurality of plates has to be welded, complicating a coupling process. Moreover, since the plurality of protection plates need to be provided, the number of parts increases. However, in the battery module 10 according to an embodiment of the present disclosure, the casing 200 is provided as one piece, such that the number of parts and the number of welding times are smaller than in a conventional art, facilitating and simplifying a coupling process.

The casing 200 may be provided with an opening 250 to accommodate the cartridge assembly 100. Although the opening 250 is formed in a lower portion of the casing 200 and the casing 200 is provided to accommodate and surround the cartridge assembly 100 from the top of the cartridge assembly 100 in FIG. 1, the current embodiment is not limited to this illustration such that the opening 250 may be formed in an upper portion of the casing 200 and the casing 200 may be provided to accommodate and surround the cartridge assembly 100 from the bottom of the cartridge assembly 100.

When the casing 200 is provided as one piece as described above, for ease of processing, the casing 200 may include a cut bonding part 260 to bond a first front plate 211 and a second front plate 212 to each other. Referring to FIGS. 3 and 4, once the second front plate 212 is bent through a second front bent part 216, the first front plate 211 is then bent through a first front bent part 215. After the first front plate 211 is bent, the first front plate 211 and the second front plate 212 overlap each other to form the bonding part 260 that may be welded to couple the first front plate 211 and the second front plate 212 with each other. However, a scheme for coupling between the first front plate 211 and the second front plate 212 is not limited to welding, and various schemes such as a rivet, a bolt, a pin, a bracket, a moment connection, etc. may be applied to the bonding part 260 to couple the first front plate 211 and the second front plate 212 with each other. Like the above-described front plate 210, the back plate 220 may also be provided such that a second back plate 222 and a first back plate 221 are bent through a second back bent part 226 and a first back bent part 225, respectively, and are coupled by the bonding part 260, and a detailed description thereof is in common with and thus is substituted with the above-description of the front plate 210.

In the casing 200 may be formed a through part 270 through which the connector element 120 or the terminal element 130 is exposed to the outside. That is, the connector element 120 or the terminal element 130 is electrically connected with an external part or member, and to prevent the casing 200 from interfering with such electric connection, the through part 270 is formed in the casing 200. Referring to FIGS. 1 and 2, the connector element 120 or the terminal element 130 is exposed to the outside of the casing 200 through the through part 270 formed in the casing 200 and thus may be connected with an external element. The through part 270 may be formed to cut at least one surface of the casing 200, and in this case, the through part 270 is formed in a region adjacent to the bonding part 260 on a surface of the casing 200. Herein, the through part 270 is not necessarily cut to allow the connector element 120 or the terminal element 130 to be exposed to the outside, and may be formed as a small hole through which a wire, etc., runs as long as the connector element 120 or the terminal element 130 is electrically connected with an external element.

Referring to FIGS. 1 and 2, the cover 300 is coupled to the opening 250 of the casing 200. That is, the cartridge assembly 100 is accommodated in the space formed by coupling between the casing 200 and the cover 300, and is protected from external vibration or shock.

The cover 300 is coupled to the casing 200 in various ways such as welding, a bolt, a pin, etc., and preferably, using a hook member 400 as described below.

As shown in FIG. 1, when the opening 250 is formed in the lower portion of the casing 200, the cover 300 is coupled to the opening 250 of the casing 200 in the lower portion of the casing 200. In this case, the cover 300 protects the bottom of the cartridge assembly 100. However, a coupling position of the cover 300 is not limited to this example, and although not shown, when the opening 250 is formed in the upper portion of the casing 200, the cover 300 may be coupled to the opening 250 of the casing 200 in the upper portion of the casing 200. In this case, the cover 300 protects the top of the cartridge assembly 100.

Figure 5:
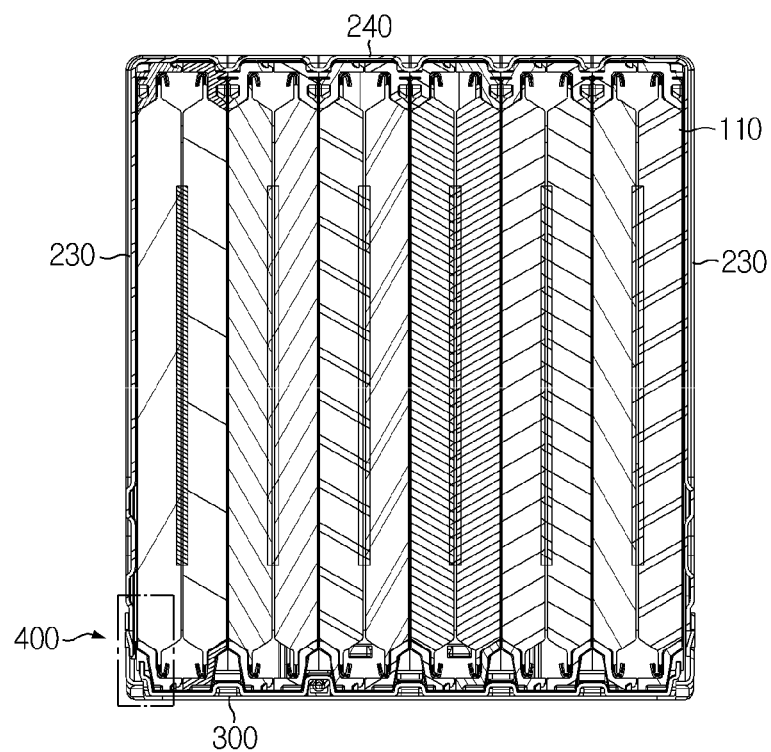
FIG. 5 is a cross-sectional view taken along line B-B of FIG. 2.
Figure 6:
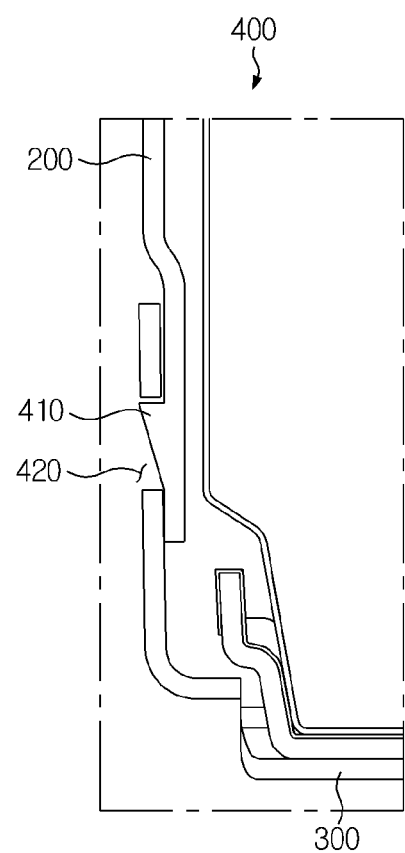
FIGS. 6 and 7 are cross-sectional views showing coupling and decoupling of a hook member in a battery module according to an embodiment of the present disclosure.
Figure 7:
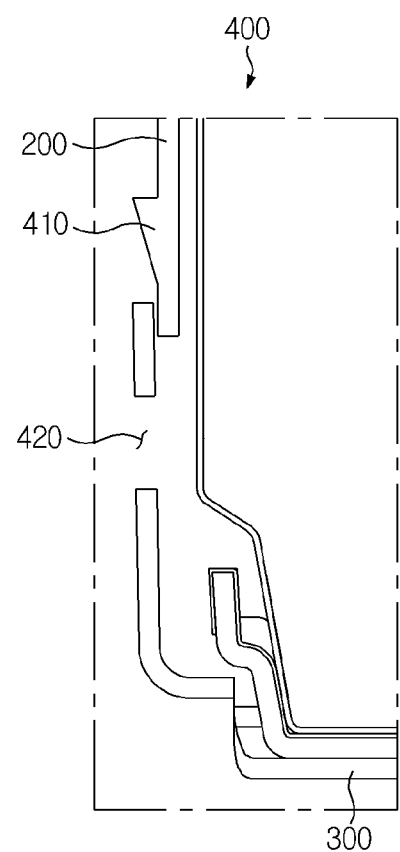

FIG. 5 is a cross-sectional view taken along a line B-B of FIG. 2, and FIGS. 6 and 7 are cross-sectional views showing coupling and decoupling of a hook member in a battery module according to an embodiment of the present disclosure.

Referring to FIGS. 5 through 7, the casing 200 and the cover 300 may be selectively coupled or decoupled to or from each other by the hook member 400. The casing 200 and the cover 300 may be coupled by bolting or welding; when the casing 200 and the cover 300 are coupled by bolting, a space for insertion of a bolt has to be secured, wasting a more space than needed, and when the casing 200 and the cover 300 are coupled by welding, the casing 200 and the cover 300 are extremely difficult to separate if an abnormal phenomenon like cell swelling, etc. occurs in the battery module 10. However, when the casing 200 and the cover 300 are coupled using the hook member 400, the coupling is easy to perform, no space is wasted because a work space needed in bolting is not required, and the casing 200 and the cover 300 may be easily separated from each other and be processed when an abnormal phenomenon occurs in the battery module 10. However, an embodiment of the present disclosure does not exclude coupling between the casing 200 and the cover 300 by bolting or welding, and the casing 200 and the cover 300 may be coupled in various manners including bolting and welding as necessary.

The hook member 400 may include a hook protrusion 410 and an coupling hole 420 with which the hook protrusion 410 is coupled. Referring to FIGS. 1, 6, and 7, one or more hook protrusions 410 may be provided in the casing 200 and the coupling hole 420 may be provided in the cover 300 to correspond to the number and positions of hook protrusions 410.

Although not shown, the one or more hook protrusions 410 may also be provided in the cover 300 and the coupling hole 420 may be provided in the casing 200 to correspond to the number and position of hook protrusions 410.

Hereinafter, operations of the battery module 10 according to an embodiment of the present disclosure will be described.

Referring to FIGS. 1 and 2, the casing 200 is coupled with the cover 300 by the hook member 400, the cartridge assembly 100 is accommodated in the internal space formed by the coupling between the casing 200 and the cover 300, thus being protected from external vibration or shock.

The first front plate 211 and the second front plate 212 of the casing 200 may form the bonding part 260 by being bent and overlapping each other, and the first front plate 211 and the second front plate 212 may be coupled with each other, preferably by welding of the bonding part 260.

The through part 270 may be formed in the region adjacent to the bonding part 260 on the surface of the casing 200, and the connector element 120 or the terminal element 130 of the cartridge assembly 100 is exposed to the outside through the through part 270 and is electrically connected with an external element.

The casing 200 may be manufactured by punching and bending one plate, and thus may be provided as one piece, thereby reducing the number of parts and facilitating and simplifying a coupling process such as welding, etc. Moreover, the casing 200 and the cover 300 are coupled by the hook member 400, making coupling and decoupling therebetween easy.

Meanwhile, a battery pack (not shown) according to an embodiment of the present disclosure may include one or more battery modules 10 according to an embodiment of the present disclosure. The battery pack (not shown) may further include a case for accommodating the battery module 10 and various devices for controlling charging/discharging of the battery module 10 such as a battery management system (BMS), a current sensor, a fuse, and so forth, in addition to the battery module 10.

A vehicle (not shown) according to an embodiment of the present disclosure may include the above-described battery module 10 or battery pack (not shown), and the battery pack (not shown) may include the battery module 10. The battery module 10 according to an embodiment of the present disclosure may be applied to the vehicle (not shown), e.g., a vehicle (not shown) provided to use electricity such as an electric vehicle, a hybrid vehicle, or the like.

Figure 8:
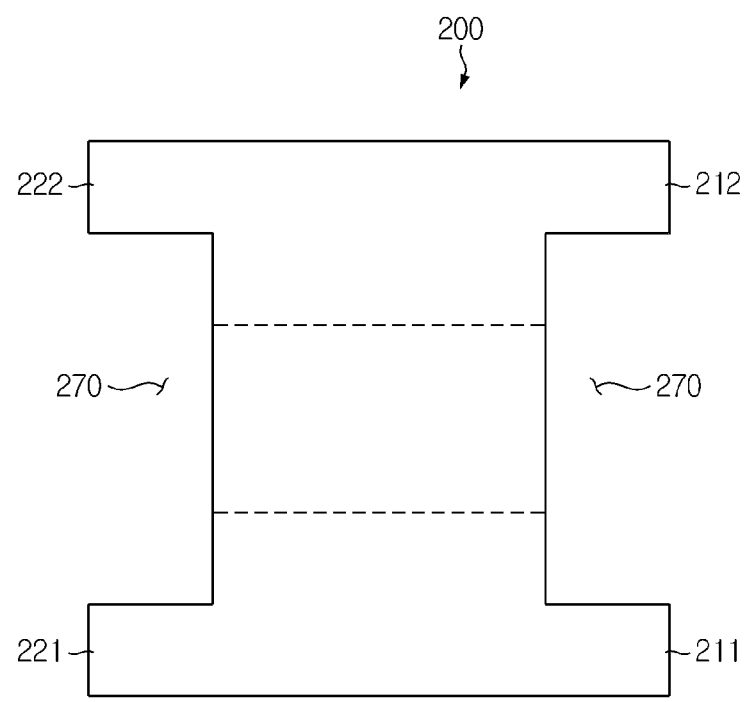
FIG. 8 is a schematic top plan view showing a punched state of a plate of a casing in a method of manufacturing a casing for a battery module according to an embodiment of the present disclosure.
Figure 9:
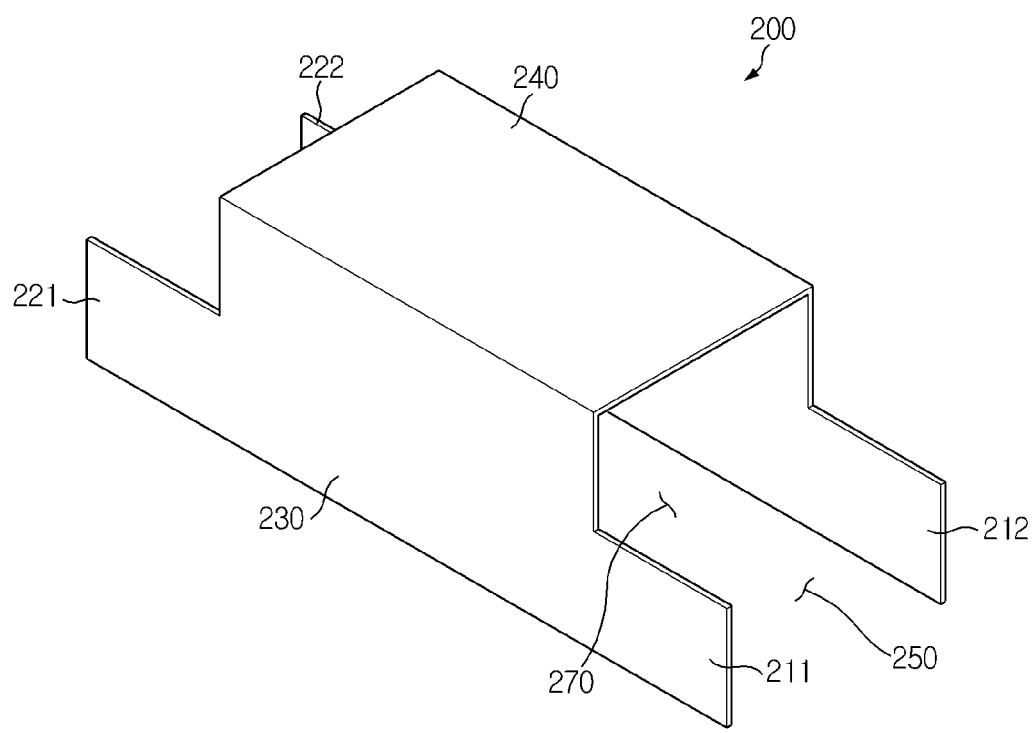
FIG. 9 is a schematic perspective view showing a bent state of a plate of a casing in a method of manufacturing a casing for a battery module according to an embodiment of the present disclosure.
Figure 10:
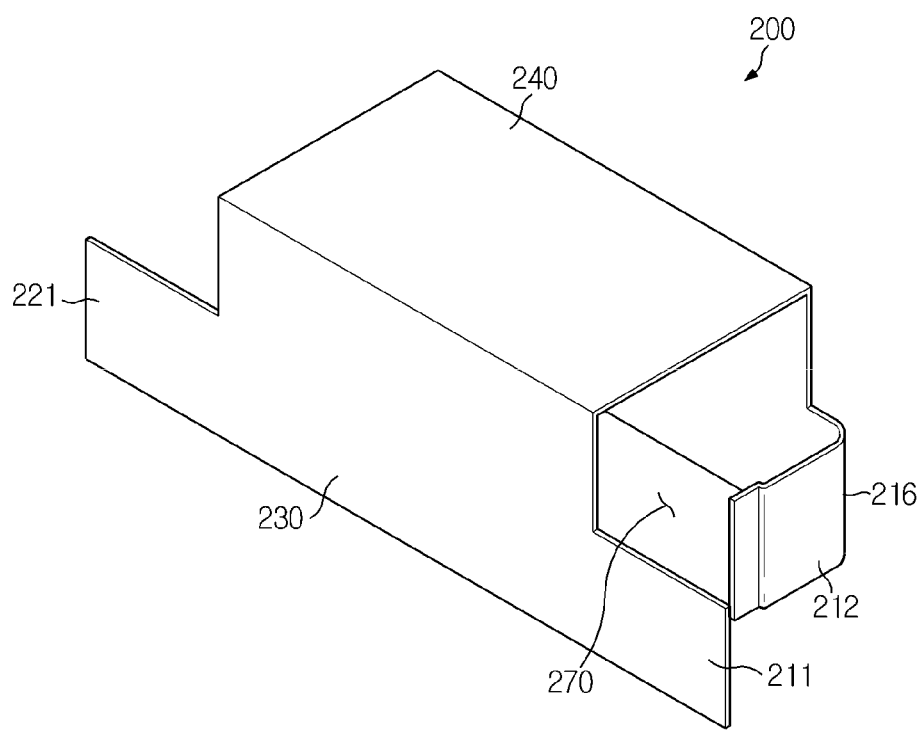
FIGS. 10 and 11 are schematic perspective views showing that bonding parts of a plate of a casing are bent to overlap each other and then are bonded to each other in a method of manufacturing a casing for a battery module according to an embodiment of the present disclosure.
Figure 11:
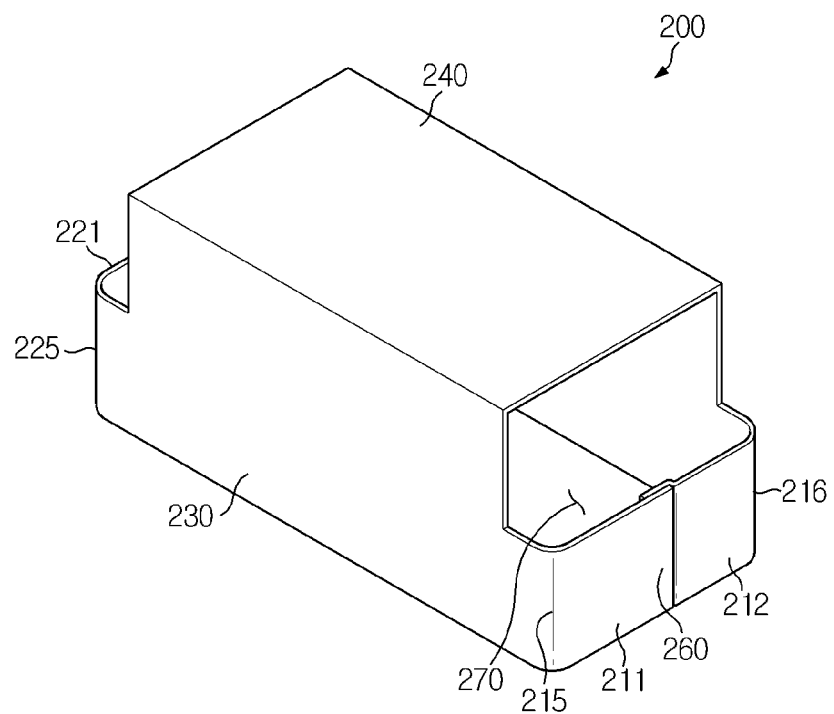

FIG. 8 is a schematic top plan view showing a punched state of a plate of a casing in a method of manufacturing a casing for a battery module according to an embodiment of the present disclosure, FIG. 9 is a schematic perspective view showing a bent state of a plate of a casing in a method of manufacturing a casing for a battery module according to an embodiment of the present disclosure, and FIGS. 10 and 11 are schematic perspective views showing that bonding parts of a plate of a casing are bent to overlap each other and then are bonded to each other in a method of manufacturing a casing for a battery module according to an embodiment of the present disclosure.

Hereinafter, a method of manufacturing a casing for a battery module according to an embodiment of the present disclosure will be described.

Referring to FIG. 8, opposite end portions of a material for manufacturing the casing 200, e.g., a plate of a metal material, are processed to have a specific shape by punching. In this case, the connector element 120 or the terminal element 130 of the cartridge assembly 100 is exposed to the outside through the through part 270 formed by punching the opposite end portions of the metal-material plate.

Referring to FIG. 9, the plate is bent to have a shape corresponding to the shape of the cartridge assembly 100 along dotted lines of FIG. 8, such that the casing 200 surrounds the cartridge assembly 100. Referring to FIGS. 10 and 11, the cut bonding part 260 is provided to bond the first front plate 211 and the second front plate 212 to each other. Referring to FIG. 10, the second front plate 212 is bent through the second front bent part 216, and referring to FIG. 11, the first front plate 211 is then bent through the first front bent part 215 and overlaps the second front plate 212, and then the first front plate 211 and the second front plate 212 are bonded to each other. Herein, the overlapping part between the first front plate 211 and the second front plate 212 forms the bonding part 260 that may be welded to couple the first front plate 211 and the second front plate 212 with each other. Like the above-described front plate 210, the back plate 220 may also be provided such that the second back plate 222 and the first back plate 221 are bent through the second back bent part 226 and the first back bent part 225, respectively, and are coupled by the bonding part 260.

However, a scheme for coupling between the first front plate 211 and the second front plate 212 and a scheme for coupling between the first back plate 221 and the second back plate 222 are not limited to welding, and various schemes such as a rivet, a bolt, a pin, a bracket, a moment connection, etc. may be applied to the bonding part 260 to couple the first front plate 211 and the second front plate 212 and to couple the first back plate 221 and the second back plate 222 with each other.

Meanwhile, the battery module 10 according to an embodiment of the present disclosure may include the casing 200 manufactured by the above-described method of manufacturing the casing 200.

Although the present disclosure has been described with reference to limited embodiments and drawings, the present disclosure is not limited thereto, and it would be obvious that various modifications and changes may be made by those of ordinary skill in the art without departing from the technical spirit of the present disclosure and a scope equivalent to the appended claims.

INDUSTRIAL APPLICABILITY

The present disclosure relates to a battery module, a battery pack including the same, and a method of manufacturing a casing for the battery module, and is applicable particularly to the industry associated with secondary batteries.

What is claimed is:

1. A battery module comprising:
a cartridge assembly comprising a plurality of cartridges, each cartridge accommodating a battery cell;
a casing comprising an opening formed therein, and accommodating the cartridge assembly through the opening and surrounding the cartridge assembly; and
a cover coupled to the opening of the casing,
wherein the casing includes a top surface, a first side surface connected to the top surface and having a first extension, and a second side surface opposite the first side surface and having a second extension, the first extension being bent to extend towards the second side surface and the second extension being bent to extend towards the first side surface such that the first extension and the second extension overlap, and
wherein the first extension is directly bonded to the second extension.

2. The battery module of claim 1, wherein the casing further comprises a through part formed to expose at least one of a connector element and a terminal element of the cartridge assembly to outside.

3. The battery module of claim 2, wherein the through part is formed in a region adjacent to the first and second extensions.

4. The battery module of claim 1, further comprising a hook member selectively coupling and decoupling the casing and the cover with or from each other.

5. The battery module of claim 4, wherein the hook member comprises:
at least one hook protrusion provided on the casing; and
at least one coupling hole provided in the cover to allow the hook protrusion to be coupled thereto.

6. The battery module of claim 4, wherein the hook member comprises:
at least one hook protrusion provided on the cover; and
at least one coupling hole provided in the casing to allow the hook protrusion to be coupled thereto.

7. A battery pack comprising the battery module according to claim 1.

8. A vehicle comprising the battery module according to claim 1.

* * * * *